US012676504B1

(12) United States Patent
Johnson

(10) Patent No.: US 12,676,504 B1
(45) Date of Patent: Jul. 7, 2026

(54) DEVICE FOR SECURING A SMART WATCH TO A CHARGER

(71) Applicant: Joseph Johnson, Jacksonville, FL (US)

(72) Inventor: Joseph Johnson, Jacksonville, FL (US)

( * ) Notice: Subject to any disclaimer, the term of this patent is extended or adjusted under 35 U.S.C. 154(b) by 1037 days.

(21) Appl. No.: 17/857,510

(22) Filed: Jul. 5, 2022

(51) Int. Cl.
*H02J 50/00* (2016.01)
*H02J 50/10* (2016.01)

(52) U.S. Cl.
CPC ............ *H02J 50/005* (2020.01); *H02J 50/10* (2016.02)

(58) Field of Classification Search
CPC ...................................................... H02J 50/005
USPC ......................................................... 320/115
See application file for complete search history.

(56) References Cited

U.S. PATENT DOCUMENTS

| | | | |
|---|---|---|---|
| 2,635,416 A | 4/1953 | Mietchen | |
| D267,239 S | 12/1982 | Allen | |
| 5,272,682 A | 12/1993 | Falcone | |
| 9,967,650 B2 | 5/2018 | Chawan | |
| 10,146,188 B2 | 12/2018 | Katzer | |
| 10,312,717 B2 * | 6/2019 | Green | H02J 7/0044 |
| 2007/0276270 A1 * | 11/2007 | Tran | A61B 5/0022 |
| | | | 600/508 |
| 2015/0333302 A1 | 11/2015 | Johns | |
| 2017/0093200 A1 * | 3/2017 | Green | H02J 7/0044 |
| 2019/0230507 A1 * | 7/2019 | Li | H04W 12/06 |
| 2020/0005791 A1 * | 1/2020 | Rakshit | G10L 15/26 |
| 2021/0099030 A1 * | 4/2021 | Walton | H02J 50/005 |

FOREIGN PATENT DOCUMENTS

WO          2015175927          11/2015

* cited by examiner

*Primary Examiner* — Yalkew Fantu

(57) ABSTRACT

The device for securing a smart watch to a charger is a mechanical structure. The device for securing a smart watch to a charger comprises a binding structure, a watch structure, and a wireless power circuit. The binding structure contains the wireless power circuit and the watch structure. The watch structure is an electrically powered instrument. The wireless power circuit is an inductive charging device. The wireless power circuit provides the watch structure with the electric energy necessary for the operation of the watch structure. The binding structure binds the watch structure to the wireless power circuit with a tight fit.

13 Claims, 7 Drawing Sheets

DEVICE FOR SECURING A SMART WATCH TO A CHARGER

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of accessories for receptacles for purposes not provided for in groups A45C1/00-A45C9/00. (A45C11/00)

SUMMARY OF INVENTION

The device for securing a smart watch to a charger is a mechanical structure. The device for securing a smart watch to a charger comprises a binding structure, a watch structure, and a wireless power circuit. The binding structure contains the wireless power circuit and the watch structure. The watch 19 structure is an electrically powered instrument. The wireless power circuit is an inductive charging device. The wireless power circuit provides the watch structure with the electric energy necessary for the operation of the watch structure. The binding structure binds the watch structure to the wireless power circuit with a tight fit.

These together with additional objects, features and advantages of the device for securing a smart watch to a charger will be readily apparent to those of ordinary skill in the art upon reading the following detailed description of the presently preferred, but nonetheless illustrative, embodiments when taken in conjunction with the accompanying drawings.

In this respect, before explaining the current embodiments of the device for securing a smart watch to a charger in detail, it is to be understood that the device for securing a smart watch to a charger is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the device for securing a smart watch to a charger.

It is therefore important that the claims be regarded as including such equivalent construction insofar as they do not depart from the spirit and scope of the device for securing a smart watch to a charger. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims. 11

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
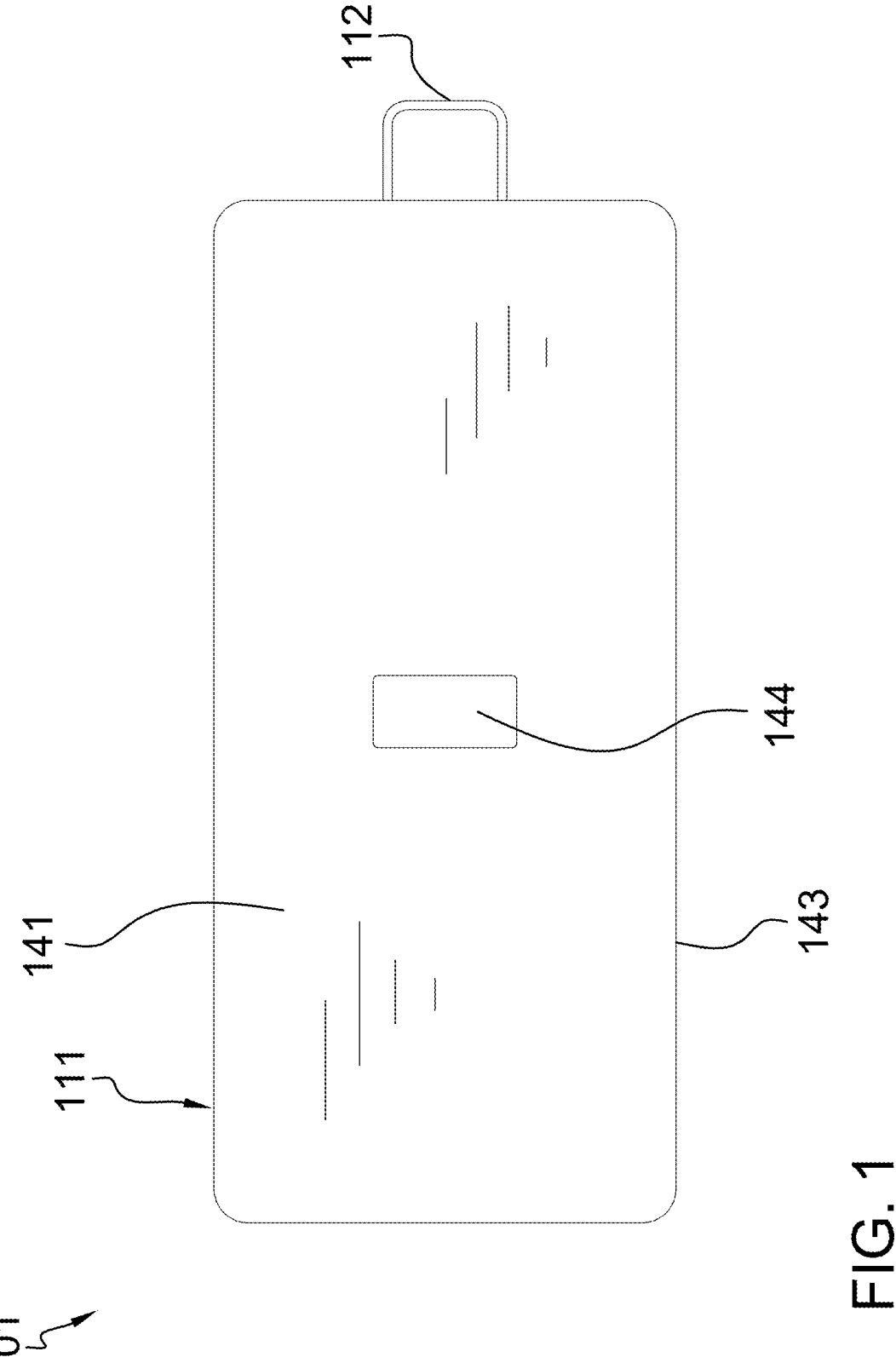
FIG. 1 is a front view of an embodiment of the 12 disclosure.
Figure 2:
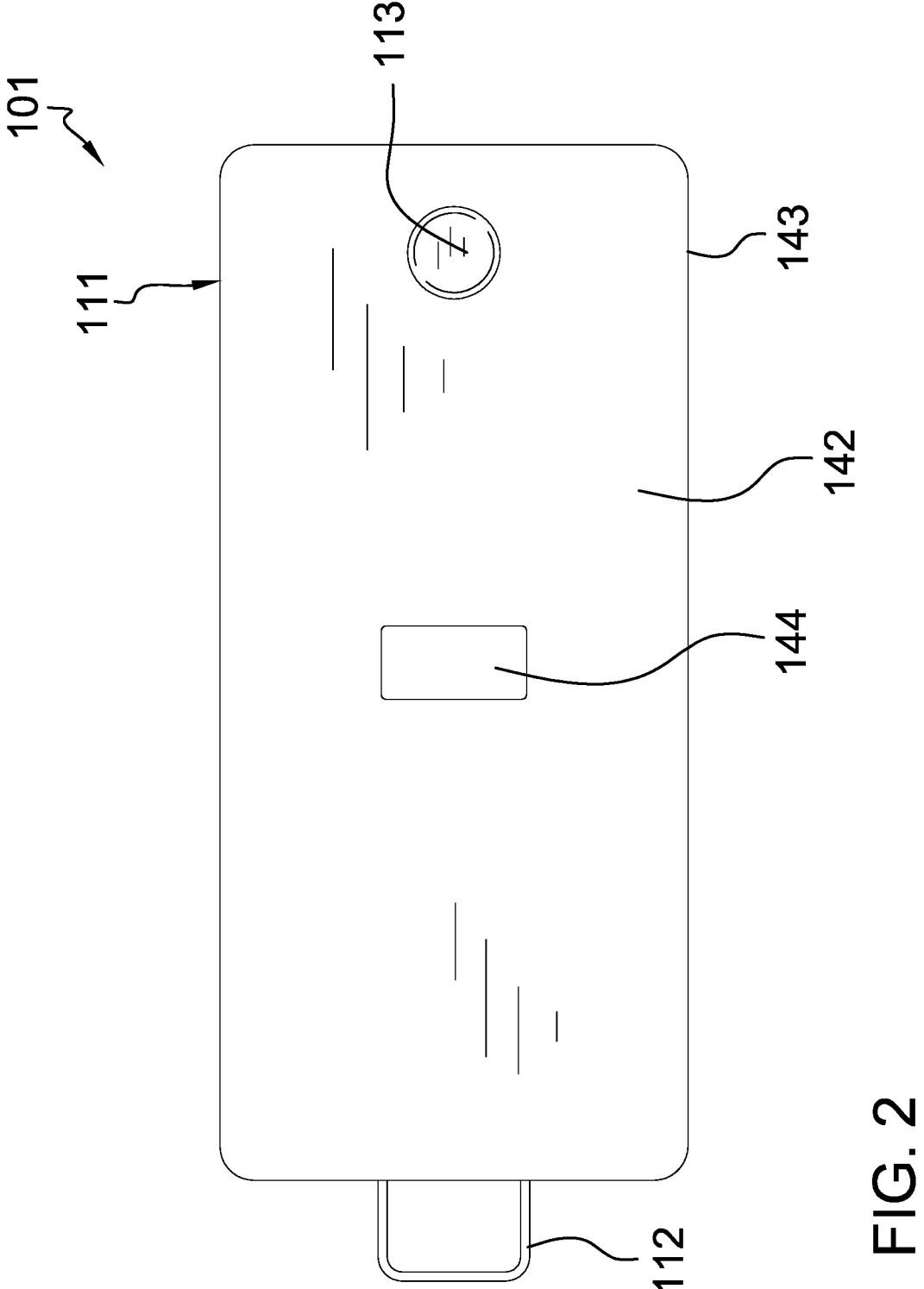
FIG. 2 is a rear view of an embodiment of the disclosure.
Figure 4:
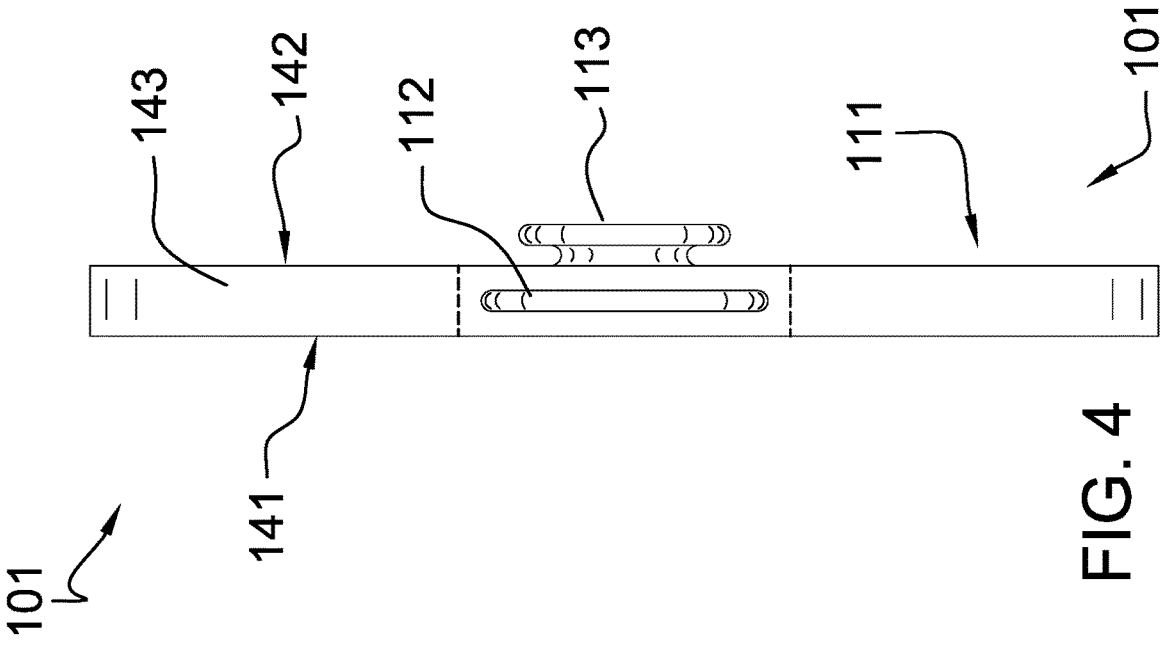
FIG. 4 is a reverse side view of an embodiment of the disclosure.
Figure 3:
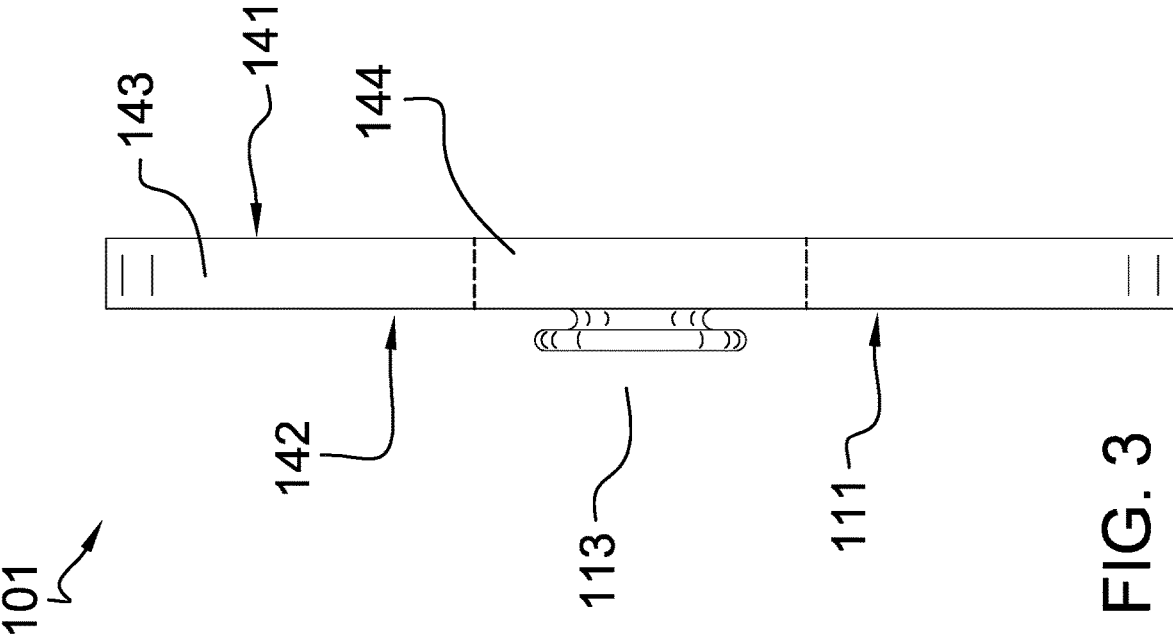
FIG. 3 is a side view of an embodiment of the disclosure.
Figure 5:
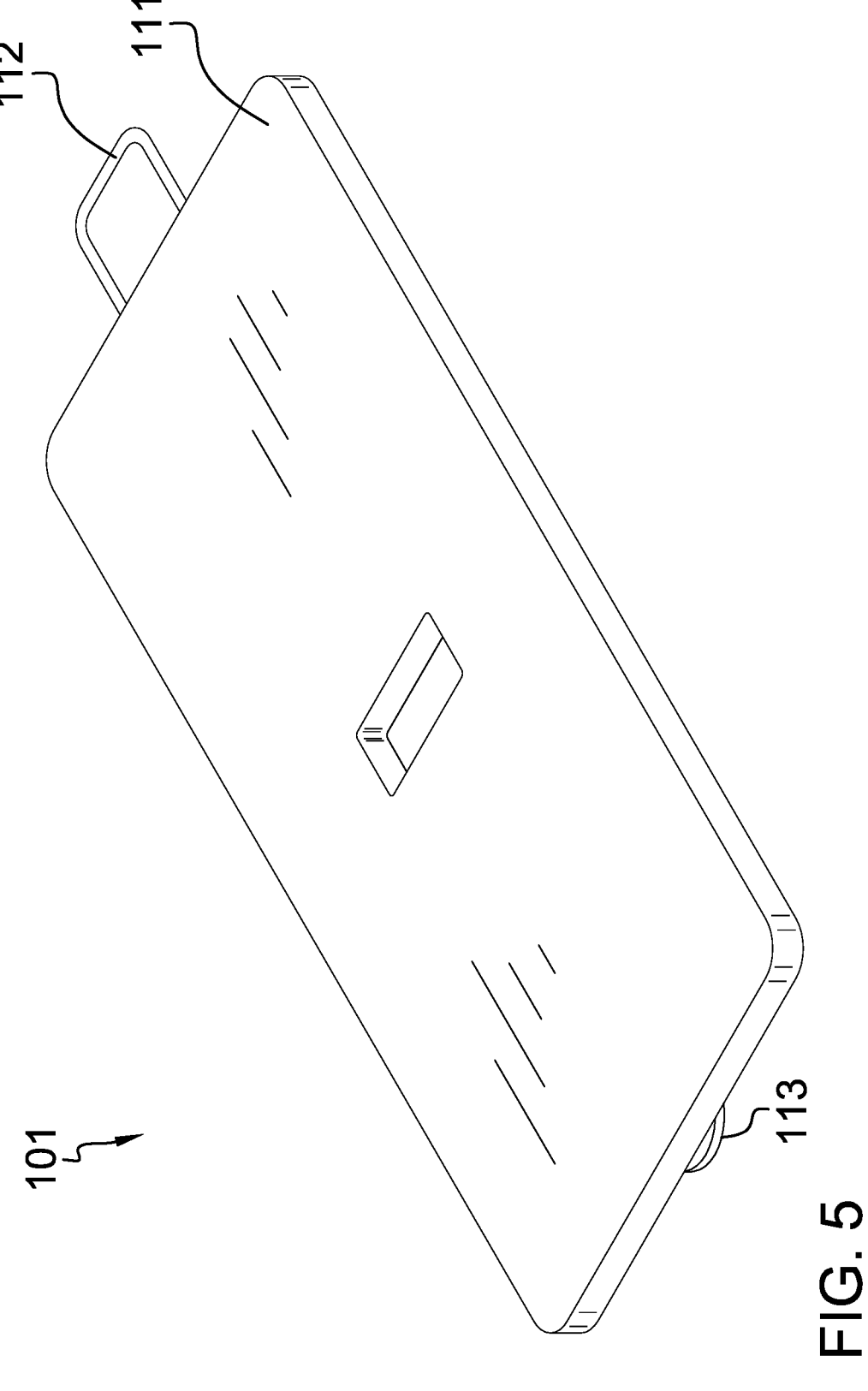
FIG. 5 is a perspective view of an embodiment of the disclosure.
Figure 6:
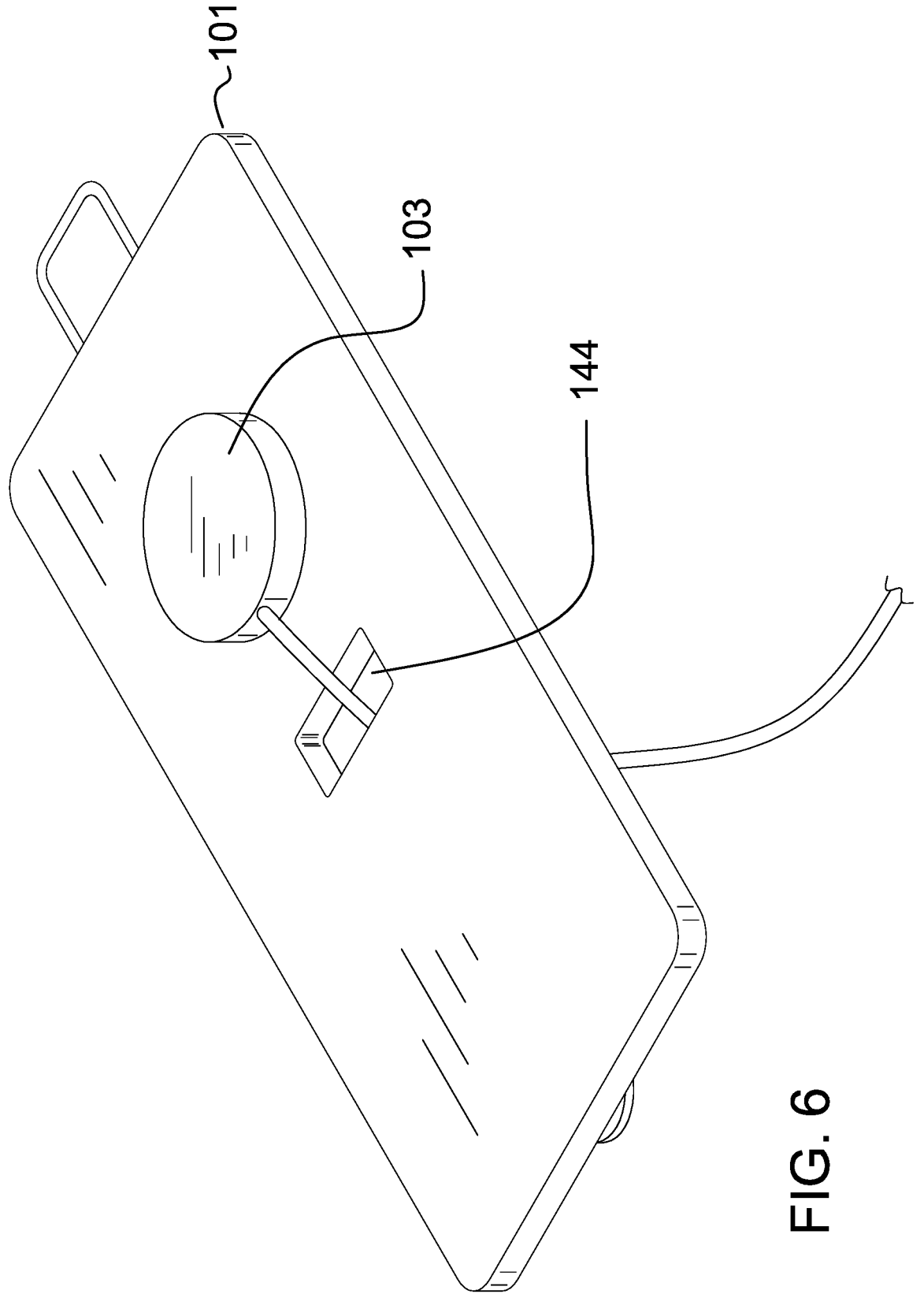
FIG. 6 is an in-use view of an embodiment of the disclosure.
Figure 7:
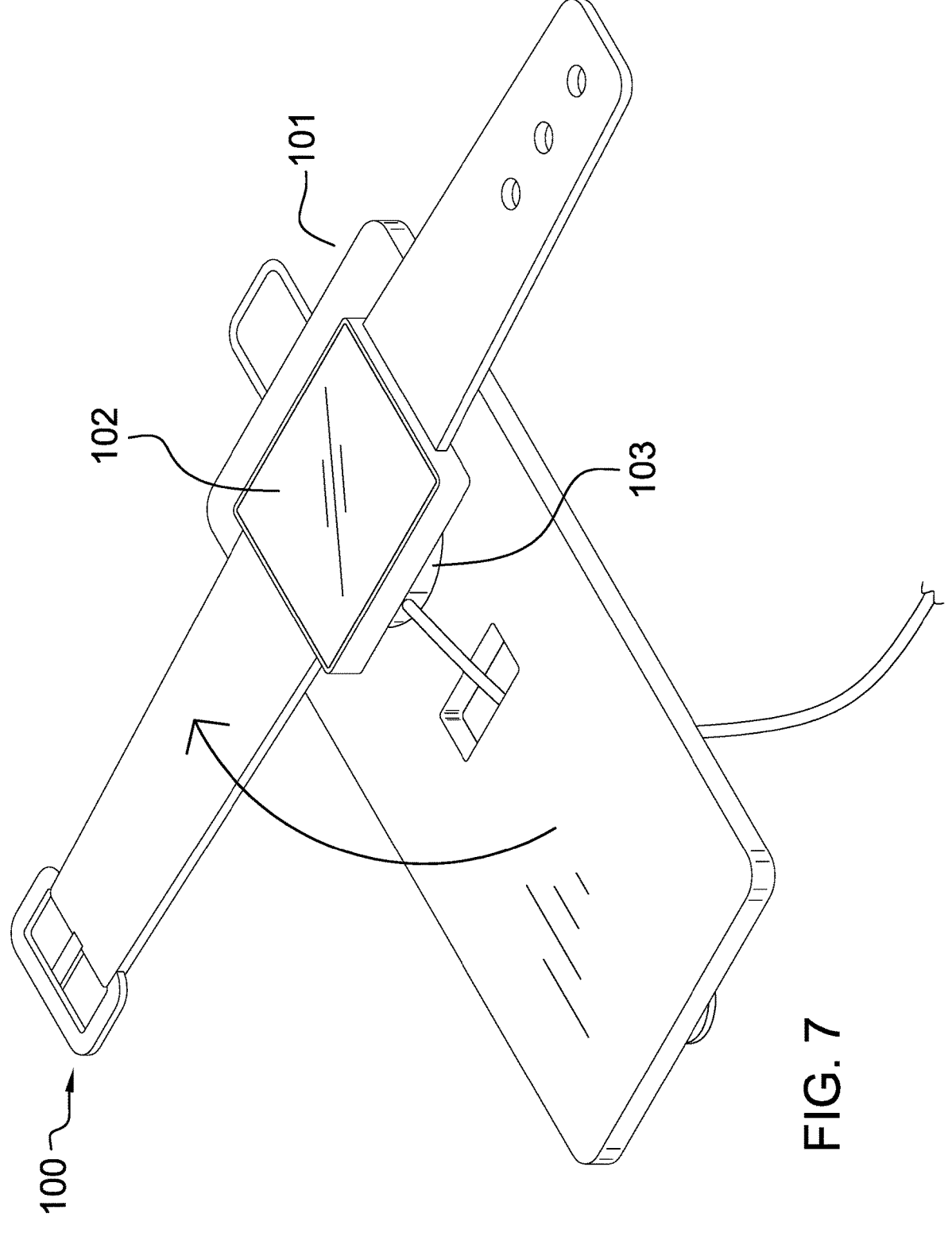
FIG. 7 is an in-use view of an embodiment of the disclosure.
Figure 8:
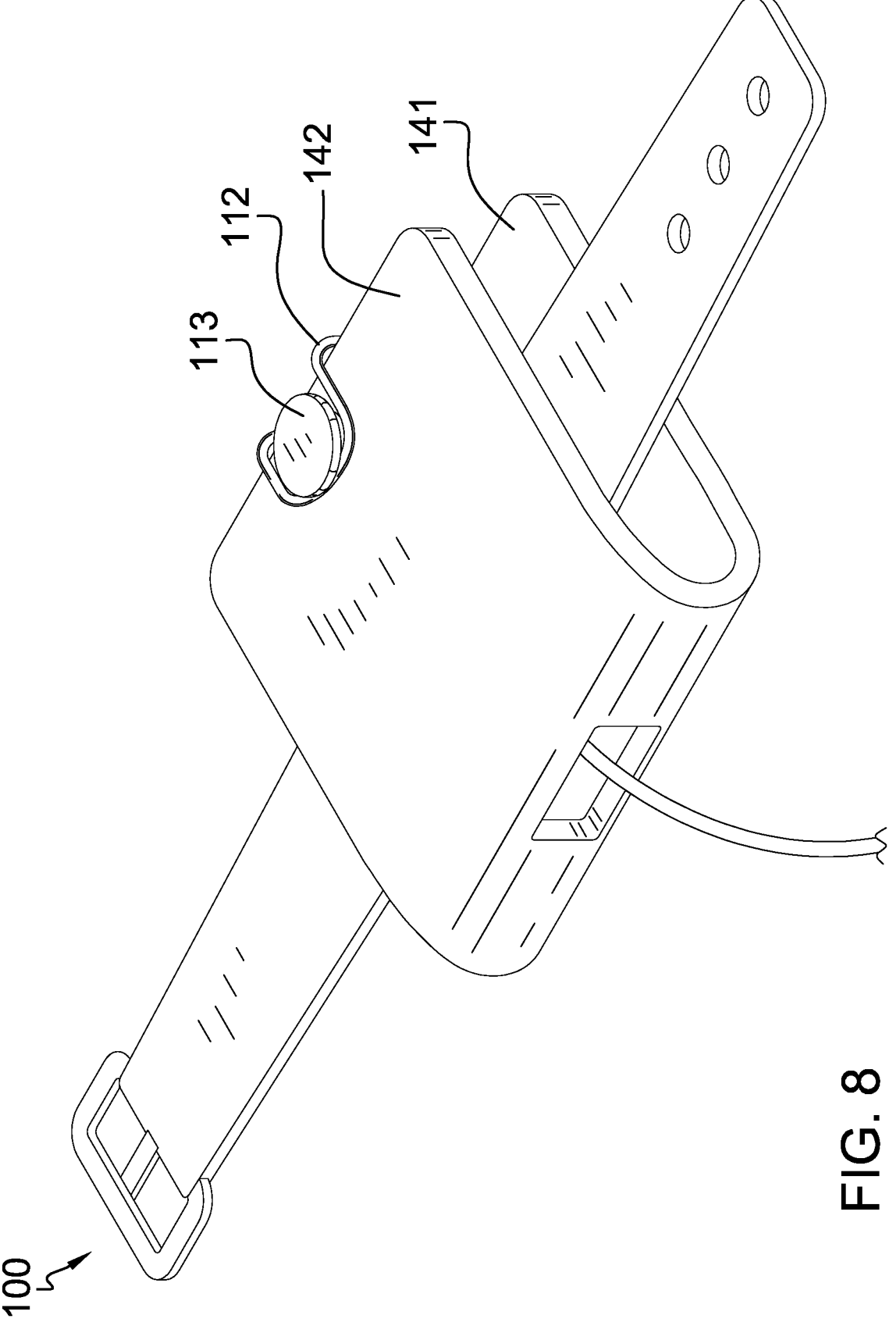
FIG. 8 is an in-use view of an embodiment of the disclosure.

Detailed reference will now be made to one or more potential embodiments of the disclosure, which are illustrated in FIGS. 1 through 8.

The device for securing a smart watch to a charger 100 (hereinafter invention) is a mechanical structure. The invention 100 comprises a binding structure 101, a watch structure 102, and a wireless power circuit 103. The binding structure 101 contains the wireless power circuit 103 and the watch structure 102. The watch structure 102 is an electrically powered instrument. The wireless power circuit 103 is an inductive charging device. The wireless power circuit 103 provides the watch structure 102 with the electric energy necessary for the operation of the watch structure 102. The binding structure 101 binds the watch structure 102 to the wireless power circuit 103 with a tight fit.

The watch structure 102 is a measurement device. The watch structure 102 measures the passage of time. The watch structure 102 is an electrically powered device. The wireless power circuit 103 provides the watch structure 102 with the electric energy necessary to power the operation of the watch structure 102.

The wireless power circuit 103 is an electrical circuit. The wireless power circuit 103 powers the operation of the watch structure 102. The wireless power circuit 103: a) draws AC electrical energy from a national electric grid; and, b) wirelessly broadcasts the AC electrical energy received from the national electric grid to the watch structure 102.

The binding structure 101 is an elastic structure. The binding structure 101 contains the watch structure 102 and the wireless power circuit 103. The binding structure 101 is formed with all apertures and form factors necessary to allow the binding structure 101 to accommodate the use and operation of the watch structure 102 and the wireless power circuit 103. The binding structure 101 holds the watch structure 102 in a fixed position relative to the wireless power circuit 103 such that the wireless power circuit 103 can recharge the watch structure 102. The binding structure 101 folds around the watch structure 102 and the wireless power circuit 103. The binding structure comprises an elastic disk 111, an elastic loop 112, and a post structure 113. The elastic loop 112 and the post structure attach to the elastic disk 111.

The binding structure 101 is an elastic structure. The binding structure 101 is a fastening device. The binding structure 101 binds the watch structure 102 to the wireless power circuit 103. The binding structure 101 secures the watch structure 102 to the wireless power circuit 103 such that the position of the watch structure 102 relative to the wireless 16 power circuit 103 is fixed. The binding structure 101 has the primary shape of a disk. The elastic nature of the binding structure 101 allows the binding structure 101 to be folded onto itself. The binding structure 101 folds around the watch structure 102 and the wireless power circuit 103 such that the watch structure 102 and the wireless power circuit 103 are sandwiched within the binding structure 101. The elastic disk 111 further comprises a first congruent end 141, a second congruent end 142, a lateral face structure 143, and a cord aperture 144.

The elastic disk 111 is a disk shaped structure. The elastic disk 111 is an elastic structure. The elastic disk 111 is a foldable structure. The elastic disk 111 folds around the watch structure 102 and the wireless power circuit 103 such that the watch structure 102 and the wireless power circuit 103 are sandwiched within the elastic disk 111. The elastic loop 112 attaches to the elastic disk 111. The post structure 113 attaches to the elastic disk 111.

The first congruent end 141 is a congruent end of the disk structure of the elastic disk 111. The first congruent end 141 is the face of the elastic disk 111 with the greatest surface area. The elastic disk 111 folds onto itself such that the watch structure 102 and the wireless power circuit 103 is sandwiched within the first congruent end 141 of the elastic disk 111.

The second congruent end 142 is a congruent end of the disk structure of the elastic disk 111. The second congruent end 142 is the face of the elastic disk 111 that is distal from the first congruent end 141. The second congruent end 142 forms the exterior surface of the binding structure 101 when the watch structure 102 and the wireless power circuit 103 are sandwiched within the binding structure 101.

The lateral face structure 143 forms the lateral face of the disk structure of the binding structure 101. The cord aperture 144 is a negative space that is formed through the first congruent end 141 and the second congruent end 142 of the disk structure of the 111.

The cord aperture 144 is sized such that the power cord of the wireless power circuit 103 inserts through the cord aperture when the wireless power circuit 103 is contained within the elastic disk 111.

The elastic loop 112 is an elastic cord. The free ends of the elastic cord that forms the elastic loop 112 attach to the lateral face structure 143 to form a loop structure.

The post structure 113 is a prism shaped structure. The post structure 113 is a rigid structure. The post structure 113 attaches to the second congruent end 142 of the binding structure 101. The post structure 113 attaches to the second congruent end 142 such that the center axis of the prism structure of the post structure 113 projects perpendicularly away from the second congruent end 142. The post structure 113 forms an anchor that the elastic loop 112 loops around.

The post structure 113 is positioned relative to the elastic loop 112 such that the elastic loop 112 is deformed as the elastic loop 112 loops around the post structure 113. The deformation of the elastic loop 112 creates a tension that pulls the elastic disk 111 around the watch structure 102 and the wireless power circuit 103 with a tight fit.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Aperture: As used in this disclosure, an aperture is a prism-shaped negative space that is formed completely through a structure or the surface of a hollow structure.

Bend: As used in this disclosure, to bend means to apply a deforming force to an object such that the cant or curvature of the deformed object is changed.

Bind: As used in this disclosure, to bind is a verb that means to tie or secure a first object to a second object by wrapping a third object around the first object and the second object.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clock: As used in this disclosure, a clock is an instrument that measures duration. Clocks are often synchronized to a reference "time" that allows for communities to coordinate the scheduling of activities. Within this disclosure, a watch is considered to be a clock.

Closed Position: As used in this disclosure, a closed position refers to a rotating structure that is in an orientation that prevents access to the contents of the structure. The closed position is often referred to as an object being "closed."

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, yarn, and rope are synonyms for cord. This definition further includes textile webbings as a type of cord.

Correspond: As used in this disclosure, the term correspond is used as a comparison between two or more objects wherein one or more properties shared by the two or more objects match, agree, or align within acceptable manufacturing tolerances.

Curve or Curvature: As used in this disclosure, a curve refers to a continuous line that is not a straight line or a continuous surface that is not a planar surface. By continuous is meant that the continuous line or surface changes smoothly over one or more independent variables. Alternately, continuous can be taken to mean that a single valued derivative with respect to any independent variable exists for all points on the curved line or curved surface. A note on usage: within this disclosure, when a prism is said to be curved, what will be meant is that the center axis of the prism is curved. The discontinuities inherent in the ends of the prism will continue to exist in the lateral face of the curved prism.

Cushion: As used in this disclosure a cushion is an elastomeric structure formed that is used to prevent injury or damage to a person or object.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Cord: As used in this disclosure, an elastic cord is a cord that contains elastic yarns as some of the yarns that make up the cord. An elastic cord is constructed such that the elastic cord will stretch when a force is applied and will return to its original shape when after the force is removed. Shock cord and bungee cord are synonyms for elastic cord.

Elastic Nature: As used in this disclosure, an elastic nature refers to a flexible structure that returns to its relaxed shape after the flexible structure has been deformed.

Exterior: As used in this disclosure, the exterior is used as a relational term that implies that an object is not contained within the boundary of a structure or a space.

Flexible: As used in this disclosure, flexible refers to an object or material that will deform when a force is applied to it but that will not necessarily return to its original shape when the deforming force is removed.

Fold: As used in this disclosure, to fold means to bend an object back upon itself.

Form Factor: As used in this disclosure, the term form factor refers to the size and shape of an object.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Impact: As used in this disclosure, an impact refers to an exchange of momentum between two objects over a duration. An impact often refers to a collision between two objects.

Induction: As used in this disclosure, induction refers to a process where a first process selected from the group consisting of an electric current or an electromagnetic field generates or interacts with a second process selected from the group consisting of an electric current or an electromagnetic field.

Inductive Charging Device: As used in this disclosure, an inductive charging device is an electrical device. The inductive charging device transfers energy from a first electric device to a second electric device. The first electric device transfers electric energy to the second electric device using induction.

Inelastic Nature: As used in this disclosure, an inelastic nature refers to a flexible structure that maintains its new shape after the flexible structure has been deformed.

Interior: As used in this disclosure, the interior is used as a relational term that implies that an object is contained within the boundary of a structure or a space.

Latch: As used in this disclosure, a latch is a fastening or locking mechanism commonly used to secure a lid, a door, or, a gate in a closed position.

Loop: As used in this disclosure, a loop is the length of a first structure including, that is folded or curved to form a closed or nearly closed space such that a linear structure such as a line, a cord or a hook can be inserted through the space formed within the first structure. Within this disclosure, the first structure is said to be looped around the linear structure.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority. The national electric grid comprises one or more utilities that sell electrical power for use by an electrical load. The national electric grid invoices for electrical power based on the total energy consumed by the electrical load. The national electric grid measures the energy consumption of an electrical load with an electrical meter. The national electric grid provides power through electrical connections known as a hot lead and a neutral lead.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a rotating structure that is in an orientation that allows access to the contents of the structure. The open position is often referred to as an object being "open."

Orientation: As used in this disclosure, orientation refers to the positioning of a first object relative to: 1) a second object; or, 2) a fixed position, location, or direction.

Pad: As used in this disclosure, a pad is a disk-shaped mass of elastic material. A pad is often used: a) for protection against damage or injury; or b) grip security. Commonly used padding materials include, but are not limited to, polyurethane foam and silicone.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Port: As used in this disclosure, a port is an opening formed in a first object that allows a second object to pass through a boundary formed by the first object.

Post: As used in this disclosure, a post is a shaft that is: 1) set into a surface; and 2) forms a load bearing structure that is perpendicular to the surface.

Primary Shape: As used in this disclosure, the primary shape refers to a description of the rough overall geometric shape of an object that is assembled from multiple components or surfaces.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Relaxed Shape: As used in this disclosure, a structure is considered to be in its relaxed state when no shear, strain, or torsional forces are being applied to the structure.

Rigid Structure: As used in this disclosure, a rigid structure is a solid structure formed from an inelastic material that resists changes in shape. A rigid structure will permanently deform as it fails under a force.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Sandwich: As used in this disclosure, to sandwich means to insert a first disk-shaped structure between a second disk-shaped structure and a third disk-shaped structure to form a composite prism structure. Specifically: a) a first congruent end of the first disk-shaped structure is placed against a first interior congruent end of the second disk-shaped structure; and, b) a second congruent end of the first disk-shaped structure is placed against a second interior congruent end of the third disk-shaped structure. A first exterior congruent end of the second disk-shaped structure forms a first overall congruent end of the overall composite prism structure described in this definition. A second exterior congruent end of the third disk-shaped structure forms a second overall congruent end of the overall composite prism structure described in this definition. The second overall congruent end of the overall composite prism structure is distal from the first overall congruent end. The verb to sandwich describes the act of placing the second disk-shaped structure between the first disk-shaped structure and the third disk-shaped structure.

Strap: As used in this disclosure a strap is a strip of leather, cloth, or other flexible material, often with a buckle, that is used to fasten, secure, carry, or hold onto something.

Strip: As used in this disclosure, the term describes a long and narrow object of uniform thickness that appears thin relative to the length of the object. Strips are often rectangular in shape.

Tight Fit: As used in this disclosure, a tight fit refers to the insertion of a first object into a second object such that there is not a lot of space between the first object and the second object. By not a lot of space is meant that friction occurs when the first object moves within the second object.

Watch: As used in this disclosure, a watch is a clock that is carried or worn by a person.

Wireless: As used in this disclosure, wireless is an adjective that is used to describe a communication link between two devices that does not require the use of physical cabling.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A device for securing a smart watch to a charger comprising a binding structure, a watch structure, and a wireless power circuit;
    wherein the binding structure contains the wireless power circuit and the watch structure such that the watch structure does not become disengaged from the wireless power circuit;
    wherein the binding structure comprises an elastic disk, an elastic loop, and a post structure;
    wherein the elastic loop and the post structure attach to the elastic disk;
    wherein the elastic disk is a foldable structure such that the elastic disk folds around the watch structure and the wireless power circuit such that the watch structure and the wireless power circuit are sandwiched within the elastic disk thereby securing the watch structure to the wireless power circuit;
    wherein the elastic disk further comprises a first congruent end, a second congruent end, and a lateral face structure;
    wherein the first congruent end is a congruent end of the disk structure of the elastic disk;
    wherein the first congruent end is the face of the elastic disk with a greatest surface area;
    wherein the elastic disk folds onto itself such that the watch structure and the wireless power circuit is sandwiched within the first congruent end of the elastic disk;
    wherein the second congruent end is a congruent end of the disk structure of the elastic disk;
    wherein the second congruent end is the face of the elastic disk that is distal from the first congruent end;
    wherein the second congruent end forms the exterior surface of the binding structure when the watch structure and the wireless power circuit are sandwiched within the binding structure;
    wherein the lateral face structure forms the lateral face of the disk structure of the binding structure.

2. The device for securing a smart watch to a charger according to claim 1 wherein the watch structure is an electrically powered instrument;
    wherein the wireless power circuit is an inductive charging device;
    wherein the wireless power circuit provides the watch structure with the electric energy necessary for the operation of the watch structure.

3. The device for securing a smart watch to a charger according to claim 2 wherein the binding structure binds the watch structure to the wireless power circuit.

4. The device for securing a smart watch to a charger according to claim 3 wherein the watch structure is a measurement device;
    wherein the watch structure measures the passage of time.

5. The device for securing a smart watch to a charger according to claim 4 wherein the wireless power circuit is an electrical circuit;
    wherein the wireless power circuit powers the operation of the watch structure;
    wherein the wireless power circuit: a) draws ac electrical energy from a national electric grid; and, b) wirelessly broadcasts the ac electrical energy received from the national electric grid to the watch structure.

6. The device for securing a smart watch to a charger according to claim 5 wherein the binding structure is an elastic structure;
    wherein the binding structure contains the watch structure and the wireless power circuit;
    wherein the binding structure holds the watch structure in a fixed position relative to the wireless power circuit.

7. The device for securing a smart watch to a charger according to claim 6 wherein the binding structure folds around the watch structure and the wireless power circuit.

8. The device for securing a smart watch to a charger according to claim 7 wherein the binding structure is an elastic structure;
    wherein the binding structure is a fastening device;
    wherein the binding structure binds the watch structure to the wireless power circuit;
    wherein the binding structure secures the watch structure to the wireless power circuit such that the position of the watch structure relative to the wireless power circuit is fixed.

9. The device for securing a smart watch to a charger according to claim 8 wherein the binding structure has the primary shape of a disk;
    wherein the elastic nature of the binding structure allows the binding structure to be folded onto itself;
    wherein the binding structure folds around the watch structure and the wireless power circuit such that the watch structure and the wireless power circuit are sandwiched within the binding structure.

10. The device for securing a smart watch to a charger according to claim 9
    wherein the elastic disk is a disk shaped structure;
    wherein the elastic disk is an elastic structure.

11. The device for securing a smart watch to a charger according to claim 10
    wherein the elastic disk further comprises a cord aperture;
    wherein the cord aperture is a negative space that is formed through the first congruent end and the second congruent end of the disk structure of the elastic disk;

wherein the cord aperture is sized such that the power cord of the wireless power circuit inserts through the cord aperture when the wireless power circuit is contained within the elastic disk.

12. The device for securing a smart watch to a charger according to claim 11 wherein the elastic loop is an elastic cord;

wherein the free ends of the elastic cord that forms the elastic loop attach to the lateral face structure to form a loop structure.

13. The device for securing a smart watch to a charger according to claim 12 wherein the post structure is a prism shaped structure;

wherein the post structure is a rigid structure;

wherein the post structure attaches to the second congruent end of the binding structure;

wherein the post structure attaches to the second congruent end such that the center axis of the prism structure of the post structure projects perpendicularly away from the second congruent end;

wherein the post structure forms an anchor that the elastic loop loops around;

wherein the post structure is positioned relative to the elastic loop such that the elastic loop is deformed as the elastic loop loops around the post structure.

* * * * *